(12) United States Patent
Martin et al.

(10) Patent No.: US 12,478,931 B2
(45) Date of Patent: Nov. 25, 2025

(54) AUTOMATED MIXING SYSTEM FOR CARTRIDGES CONTAINING MATERIALS

(71) Applicant: Lockheed Martin Corporation, Bethesda, MD (US)

(72) Inventors: Jennifer M. Martin, North Richland Hills, TX (US); Esteban Salcedo, River Oaks, TX (US); Matthew Timothy McKee, Fort Worth, TX (US); Linda Dao, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 600 days.

(21) Appl. No.: 18/047,427

(22) Filed: Oct. 18, 2022

(65) Prior Publication Data
US 2024/0123413 A1    Apr. 18, 2024

(51) Int. Cl.
| | |
|---|---|
| *B01F 35/221* | (2022.01) |
| *B01F 27/805* | (2022.01) |
| *B01F 31/20* | (2022.01) |
| *B01F 35/212* | (2022.01) |
| *B01F 35/22* | (2022.01) |
| *B01F 35/32* | (2022.01) |
| *B01F 35/42* | (2022.01) |
| *B01F 35/71* | (2022.01) |

(52) U.S. Cl.
CPC .......... *B01F 27/805* (2022.01); *B01F 31/201* (2022.01); *B01F 35/212* (2022.01); *B01F 35/2209* (2022.01); *B01F 35/221422* (2022.01); *B01F 35/3204* (2022.01); *B01F 35/42* (2022.01); *B01F 35/7161* (2022.01)

(58) Field of Classification Search
CPC .................... B01F 35/212; B01F 35/221422
USPC .......................................................... 366/289
See application file for complete search history.

(56) References Cited

U.S. PATENT DOCUMENTS

| 4,676,655 A | 6/1987 | Handler |
| 5,145,250 A * | 9/1992 | Planck .................. B01F 27/806 |
| | | 366/173.1 |

(Continued)

FOREIGN PATENT DOCUMENTS

| CN | 105561843 A | 5/2016 |
| CN | 107175007 A | 9/2017 |

(Continued)

*Primary Examiner* — David L Sorkin
(74) *Attorney, Agent, or Firm* — Baker Botts L.L.P.

(57) ABSTRACT

Current cartridge-style mixers due not have the ability to measure mixing performance nor determine the need for maintenance based on performance. Risks of non-homogeneous mixing and insufficient maintenance can exist with cartridge-style mixers. A mixing system comprises a mixing apparatus, a first switch, a magnetic switch, and a controller. The mixing apparatus is configured to receive a cartridge and to mix a material. The mixing apparatus comprises a linear actuator configured to translate the cartridge or plunger in a vertical direction and a spindle configured to rotate a plunger. The first switch is configured to measure a number of strokes per unit of time of operating the linear actuator. The magnetic switch is configured to measure a speed of the spindle. The controller is configured to receive one or more mixing parameters, actuate the spindle and the linear actuator, and actuate a light to indicate if there was sufficient mixing.

10 Claims, 2 Drawing Sheets

(56) References Cited

U.S. PATENT DOCUMENTS

| | | | |
|---|---|---|---|
| 7,751,934 | B2 | 7/2010 | Konietzko |
| 10,098,683 | B2 | 10/2018 | Vogt |
| 10,894,238 | B2 | 1/2021 | Singh et al. |
| 2012/0269029 | A1 | 10/2012 | Konietzko et al. |
| 2020/0282371 | A1 | 9/2020 | Matsushita et al. |

FOREIGN PATENT DOCUMENTS

| | | |
|---|---|---|
| CN | 109289729 A | 2/2019 |
| CN | 213643853 U | 7/2021 |
| DE | 202005005150 U1 | 7/2005 |
| KR | 101920362 B1 | 11/2018 |
| KR | 102229701 B1 | 3/2021 |
| KR | 102326488 B1 | 11/2021 |
| WO | 200130488 A2 | 5/2001 |
| WO | 2018184959 A1 | 10/2018 |

* cited by examiner

AUTOMATED MIXING SYSTEM FOR CARTRIDGES CONTAINING MATERIALS

TECHNICAL FIELD

This disclosure generally relates to mixing equipment, and more specifically to an automated mixing system for cartridges containing materials.

BACKGROUND

Materials contained within cartridges can be applied to an aircraft, to other aircraft components, and/or to other products across industries. Current cartridge-style mixers are used to mix the contents of the cartridges to produce mixtures, such as sealants and adhesives. Problems exist with these cartridge-style mixers that can lead to non-homogenous mixing of the cartridge contents. The non-homogenous mixing can cause material performance failures, which delays validation or verification of the mixing process. Current cartridge-style mixers may not have the ability to measure process performance nor determine the need for maintenance based on this performance. There exists a problem with risk of non-homogenous mixing with cartridge-style mixers.

BRIEF DESCRIPTION OF THE DRAWINGS

To assist in understanding the present disclosure, reference is now made to the following description taken in conjunction with the accompanying drawings, in which.

DETAILED DESCRIPTION

Figure 1:
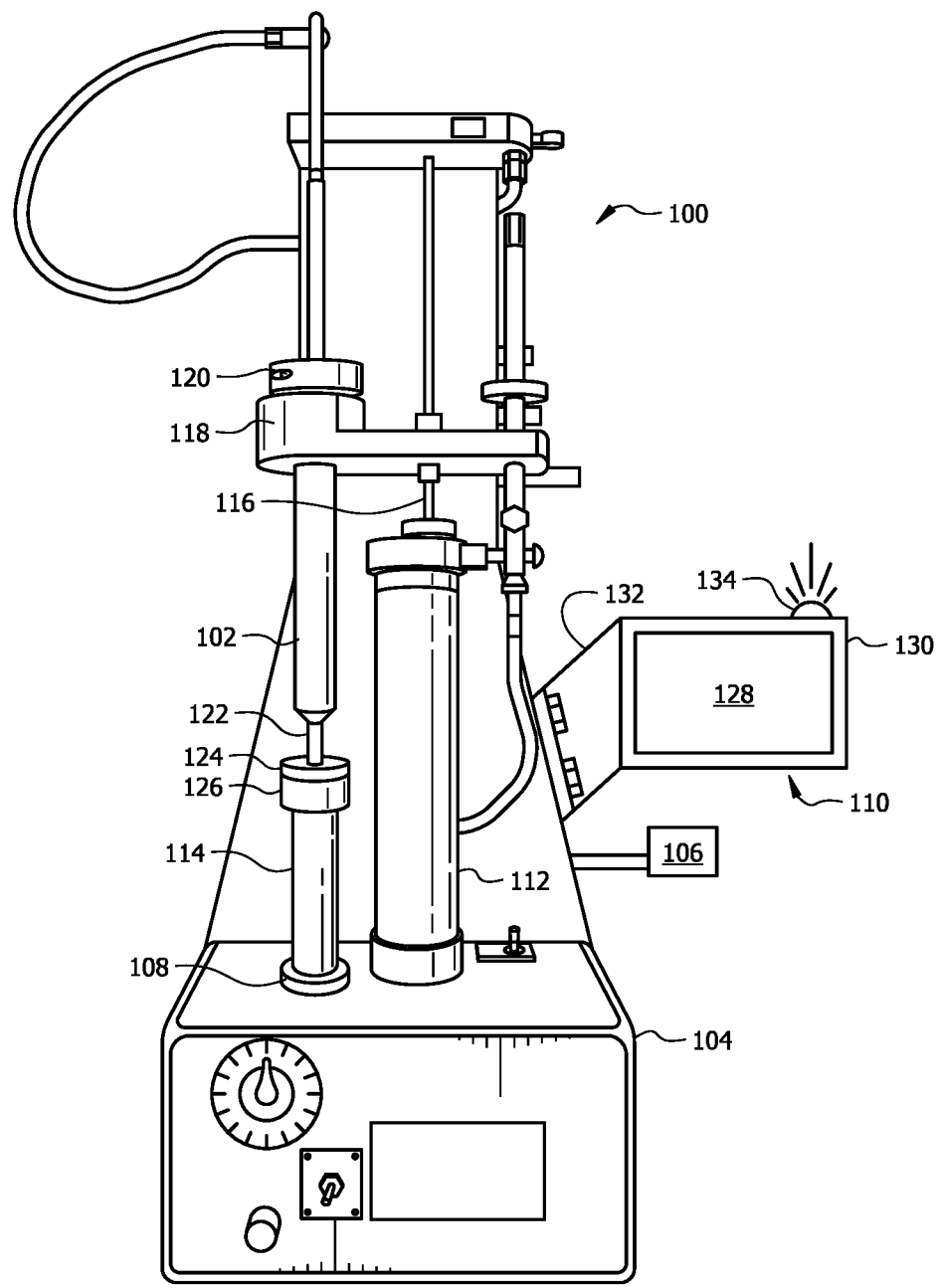
FIG. 1 illustrates an example mixing system, according to certain embodiments.

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 3, where like numbers are used to indicate like and corresponding parts.

The disclosed systems and methods provide for a mixing system configured to perform homogenous mixing to address the aforementioned problems. The disclosed mixing system is further configured to provide feedback through a visual display of data and through a light indicator that indicates if there was sufficient mixing for a cartridge based on the one or more parameters.

In general, current mixing systems only mix for a designated period of time based on a timer or a designated number of strokes, which causes problems due to non-homogenous mixing. Non-homogenous mixing may occur based on insufficient mixing requirements provided by the cartridge to be mixed, the material supplier, and/or by the document mixing instructions, uncontrolled speeds of mixing equipment across different manufacturers, inaccurate timers, operator error, and any combination thereof. There is further a delayed validation of the mixing process with current mixing systems as material testing occurs after application and curing. If non-homogenous mixing occurred, it would not be detected until the quality testing of such application after cure time had elapsed. Removal of discrepant material after mixing and waiting for material to cure is wasteful. The disclosed embodiments, however, measure rotational speed, measure stroke speed, provide an automated, accurate timer, and provide instant feedback to an operator, which provides homogenous mixing. The feedback may validate through measurements, whether or not mixing process parameters were achieved, and provides simple feedback to an operator at the end of the mix cycle if material is ready to be applied or discarded. If mixing requirements and instructions were properly defined to assure homogeneous mixing and if the mixer measured and validated process parameters, then the risk of applying non-homogeneously mixed material to the intended aircraft or component is significantly reduced. The disclosed embodiments may employ a simple light signaling to the user at the end of mixing whether or not the material received the intended mixing process parameters and records details of mixing parameters and alarms for proper maintenance and tracking of process health including statistical process control data. To provide these advantages, the disclosed embodiments utilize a sensor to measure the rotational speed of a spindle, utilize a sensor to measure a number of strokes and speed of strokes for a linear actuator, and utilize a controller that receives one or more mixing parameters and measurements from the sensors to sufficiently operate the mixing apparatus and to measure time. The controller can be retrofitted to existing mixers and/or incorporated into new systems.

FIG. 1 illustrates an example mixing system 100. The mixing system 100 may be operable to mix the contents contained within a cartridge 102. In one or more embodiments, the cartridge 102 may comprise at least one material to be mixed to prepare mixtures, such as a sealant or adhesive, for use on an aircraft vehicle or other products. The material may be any suitable material for use in preparation of a mixture, such as a base and accelerator. The cartridge 102 may be any suitable structure operable to contain the material to be mixed.

As illustrated, the mixing system 100 may comprise a mixing apparatus 104, a first switch 106, a magnetic switch 108, and a controller 110. The mixing apparatus 104 may be configured to receive the cartridge 102 containing the material and to mix the material within the cartridge 102. Any suitable mixer or mixing equipment may be used as the mixing apparatus 104. In one or more embodiments, the mixing apparatus 104 may be any suitable size, height, shape, and any combinations thereof. In embodiments, the mixing apparatus 104 may comprise any suitable materials, including, but not limited to, metals, nonmetals, polymers, ceramics, composites, and any combinations thereof.

The mixing apparatus 104 may comprise a linear actuator 112 and a spindle 114. The linear actuator 112 may be configured to translate back and forth in a vertical direction with respect to the mixing apparatus 104. In embodiments, the translation of the linear actuator 112 may be physically transferred to the cartridge 102, wherein the cartridge 102 may translate concurrently with the operation of the linear actuator 112. In other embodiments, the translation of the linear actuator 112 may be physically transferred to an impeller disposed within the cartridge 102, wherein the impeller may translate concurrently with the operation of the linear actuator 112. Additionally, the impeller may rotate concurrently with spindle 114 rotation. For example, the linear actuator 112 may comprise a piston rod 116 that extends into and out of a housing of the linear actuator 112. In certain embodiments, the piston rod 116 may be coupled to a piston disposed within the linear actuator 112, wherein air introduced by a compressed air supply may apply a force on the piston causing the piston rod 116 to translate.

In these examples, the linear actuator 112 may be a pneumatic piston, wherein the mixing apparatus 104 is coupled to a compressed air source. In other embodiments, the linear actuator 112 may be an electric linear actuator, wherein the mixing apparatus 104 is coupled to a power source operable to provide electricity. Without limitations, any suitable linear actuator maybe used as the linear actuator 112 of the present disclosure. The mixing apparatus 104 may comprise a coupler 118 configured to couple the piston rod 116 to the cartridge 102. The coupler 118 may be any suitable size, height, shape, and any combinations thereof and may comprise any suitable material in order to couple the piston rod 116 to the cartridge 102. In embodiments, the cartridge 102 may be disposed at least partially through the coupler 118, wherein the cartridge 102 may rest along an internal shoulder of the coupler 118. The mixing apparatus 104 may further comprise a cap 120 configured to secure the cartridge 102 to the coupler 118. In embodiments, the cap 120 may secure the cartridge 102 to the coupler 118 through any suitable means, including, but not limited to, fasteners, threading, welding, brazing, adhesives, interference fit, and any combinations thereof.

As the cartridge 102 is secured to the coupler 118 to indirectly couple the cartridge to the linear actuator 112, the cartridge 102 may further be coupled to the spindle 114. As illustrated, a plunger 122 may be partially disposed within the cartridge 102. In embodiments, the cartridge 102 may translate along a vertical direction in relation to the plunger 122. As the cartridge 102 translates in the vertical direction and the plunger 122 remains stationary, mixing may occur within the cartridge 102. A base 124 of the plunger 122 may be configured to couple to a top end 126 of the spindle 114, wherein the spindle 114 may be configured to rotate the plunger 122 that is partially disposed within the cartridge 102. The top end 126 of the spindle 114 may be configured to receive the base 124 of the plunger 122, wherein the base 124 is secured to the top end 126. In embodiments, an impeller may be coupled to the plunger 122 within the cartridge 102 and opposite from the base 124. The impeller may be operable to rotate concurrently with the spindle 114 to provide mixing within the cartridge 102. In one or more embodiments, the mixing apparatus 104 may be configured to mix the material within the cartridge 102 by providing vertical translation of the cartridge 102 and rotation to the plunger 122 and impeller via the spindle 114.

As illustrated, the mixing system 100 comprises the first switch 106 and the magnetic switch 108. Both the first switch 106 and the magnetic switch 108 may be coupled to the mixing apparatus 104 and operable to measure a parameter associated with operation of the mixing apparatus 104. The first switch 106 may be configured to measure a number of strokes per unit of time of operating the linear actuator 112. In embodiments, the first switch 106 may be a pneumatic switch, or any other suitable sensor (for example, another magnetic switch). The magnetic switch 108 may be configured to measure a speed of operating the spindle 114 and may be any suitable sensor. Both the first switch 106 and magnetic switch 108 may be disposed about any suitable location in relation to the mixing apparatus 104. As illustrated, the first switch 106 may be disposed below the controller 110 and proximate to the linear actuator 112. In embodiments, the magnetic switch 108 may be disposed adjacent to the spindle 114. The magnetic switch 108 may be disposed underneath, around, or abut the spindle 114. Both the first switch 106 and the magnetic switch 108 may be communicatively coupled to the controller 110. During operations, both the first switch 106 and the magnetic switch 108 may be actuated by the controller 110 and may transmit measurements to the controller 110. The controller 110 may be configured to receive one or more mixing parameters through the aforementioned sensors and through user input.

In one or more embodiments, the controller 110 may be coupled to the mixing apparatus 104, wherein the controller 110 may be communicatively coupled to at least a portion of the components of the mixing system 110. Controller 110 may be any processing device that controls the operations of one or more components of the mixing system 100 and/or produces data. Controller 110 may store mixing requirements associated with a given mixture. Controller 110 may further perform operations for intelligent, automated maintenance schedules. For example, the controller 110 may recommend accurate maintenance based on a number of strokes and/or rotations rather than manufacturer timetables. Controller 110 may be further operable to print labels for the cartridge 102 for production management or for any other suitable function/operation. The mix requirements, operator input, and/or measured data may enable information to print labels that can be applied to the cartridge 102 showing: date & time mixed, employee ID, material name, time mixed, work life expiration, remaining work life, where to discard the used cartridge 102, and an indication if mixing requirements were met for that specific cartridge 102.

As illustrated, controller 110 may comprise a display 128 housed in a casing 130 configured to display one or more measured parameters, wherein the one or more measured parameters may comprise the speed of operating the spindle and/or the number of strokes per unit of time of operating the linear actuator. The casing 130 may be any suitable size, height, shape, and any combinations thereof and may comprise any suitable material. The casing 130 may be coupled to the mixing apparatus 104 via a bracket 132, wherein the bracket 132 is configured to fasten the casing 130 to the mixing apparatus 104. While the bracket 132 is presently disclosed as coupling casing 130 to mixing apparatus 104, any other suitable means for coupling casing 130 to mixing apparatus 104 may be used. For example, suitable means may include, but is not limited to, fasteners, threading, welding, brazing, adhesives, interference fit, and any combinations thereof.

A light 134 may be disposed on top of the casing 130. In embodiments, the light 134 may be disposed about the casing 130 at any suitable location and through any suitable means. The light 134 may be configured to generate or produce a light after operation of the mixing system 100. In embodiments, the controller 110 may actuate the light 134, wherein the controller 110 is communicatively coupled to the light 134. For example, the light 134 may provide instant feedback to a user regarding the status of mixing the cartridge 102. In this example, the light 134 may be actuated to display a first color (for example, green) if there was sufficient mixing for the cartridge 102 based on the received one or more mixing parameters and to display a second color (for example, red) if there was not sufficient mixing for the cartridge 102 based on the received one or more mixing parameters. In this example, a green light at the end of the mix cycle may signify that the material received the intended mixing parameters and is ready to be applied. In the example, a red light at the end of the mix cycle may signify that the material did not receive the intended mixing parameters and should be discarded and not applied to the intended component.

During operations, the controller 110 may be configured to receive signals from the first switch 106, magnetic switch 108, and/or user input for processing, process the received signals, display and store one or more measured parameters, actuate the light 134, and any combinations thereof. For example, the controller 110 may store one or more mixing parameters for a given cartridge 102. A user may input the type of cartridge 102 secured to the mixing apparatus 104 to be mixed, and the controller 110 may determine which mixing parameters to employ based on the user input. The controller 110 may initiate an automated timer and actuate the spindle 114 and linear actuator 112 to operate at a set rate for the time designated by the automated timer based on the determined mixing parameters. In other embodiments, the controller 110 may receive measurements associated with operation of the spindle 114 and linear actuator 112.

For example, the linear actuator 112 may be instructed to operate at thirty strokes-per-minute (SPM), which may be verified by measurements received from the first switch 106. The spindle 114 may be instructed to operate at one hundred and fifty revolutions-per-minute (RPM), which may be verified by measurements received from the magnetic switch 108. Without limitations, the one or more mixing parameters may include size of cartridge 102, material within cartridge 102 to be mixed, total strokes for linear actuator 112, total rotations for spindle 114 (i.e., number of rotations over a period of time), mixing time, strokes per minute, revolutions per minute, temperature, model of mixing apparatus 104, user identification, location of mixing apparatus 104, any other suitable parameters, and any combinations thereof. Once the timer has stopped, the controller 110 may verify that the performance of the mixing apparatus 104 correlated to the determined mixing parameters for that cartridge 102. If satisfactory, the controller 110 may actuate the light 134 to generate a light designating that homogenous mixing occurred within the cartridge 102. Controller 110 may be hard-wired and/or wirelessly connected to mixing apparatus 104. Controller 110 may use one or more elements illustrated further in FIG. 2.

Figure 2:
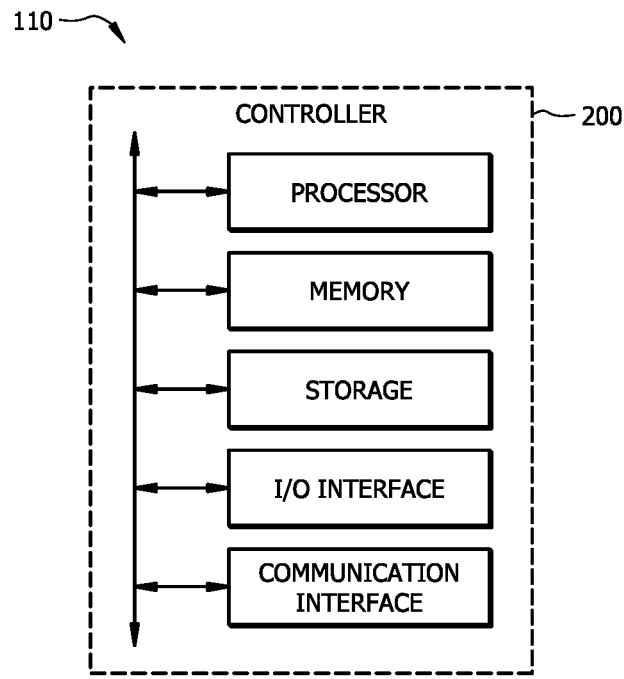
FIG. 2 illustrates an example controller of the mixing system in FIG. 1, according to certain embodiments.

FIG. 2 illustrates an example of elements 200 that may be included in controller 110, according to certain embodiments. For example, controller 110 may include one or more interface(s), processing circuitry, memory(ies), and/or other suitable element(s) (such as display 128 from FIG. 1). Interface receives input, sends output, processes the input and/or output, and/or performs other suitable operation. Interface may comprise hardware and/or software.

Processing circuitry performs or manages the operations of the component. Processing circuitry may include hardware and/or software. Examples of a processing circuitry include one or more computers, one or more microprocessors, one or more applications, etc. In certain embodiments, processing circuitry executes logic (e.g., instructions) to perform actions (e.g., operations), such as generating output from input. The logic executed by processing circuitry may be encoded in one or more tangible, non-transitory computer readable media (such as memory). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory (or memory unit) stores information. Memory may comprise one or more non-transitory, tangible, computer-readable, and/or computer-executable storage media. Examples of memory include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 3:
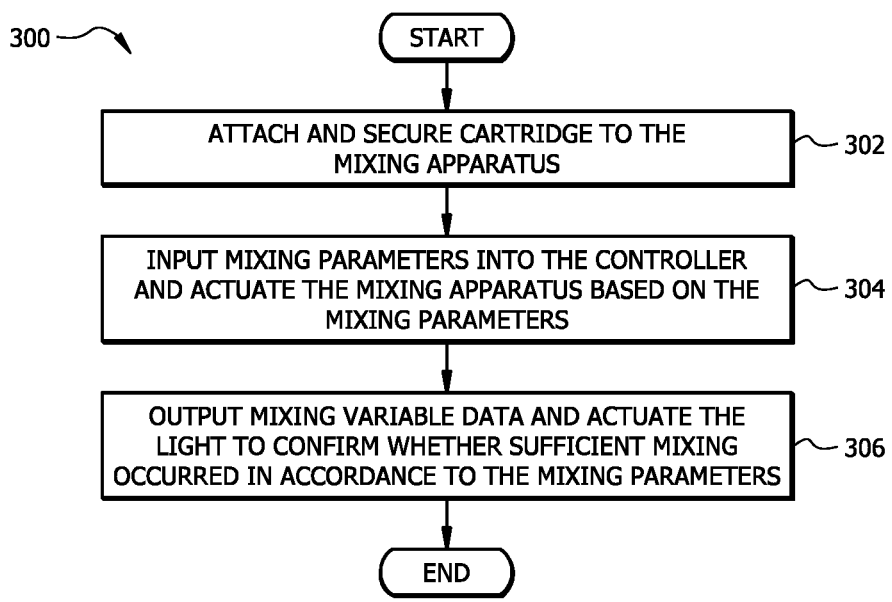
FIG. 3 illustrates an example method of operation of the mixing system in FIG. 1, according to certain embodiments.

FIG. 3 is a flow diagram illustrating an example method 300 of the mixing system 100 of FIG. 1. The method 300 may begin at step 302 wherein a user may attach and secure the cartridge 102 (referring to FIG. 1) to the mixing apparatus 104 (referring to FIG. 1). Step 302 further comprises partially disposing the cartridge 102 into and through the coupler 118 (referring to FIG. 1) and securing the cartridge 102 to the coupler 118 via the cap 120 (referring to FIG. 1). The base 124 (referring to FIG. 1) of the plunger 122 (referring to FIG. 1) may then be coupled to the top end 126 (referring to FIG. 1) of the spindle 114 (referring to FIG. 1). In an example, pins may protrude from the top end 126, and the base 124 may be configured to receive the pins, securing the base 124 to the spindle 114.

At step 304, the user may input one or more mixing parameters associated with the cartridge 102 into the controller 110 (referring to FIG. 1). In alternate embodiments, the controller 110 may have stored the one or more mixing parameters in a memory, and the user may verify the one or more mixing parameters for the attached cartridge 102. Without limitations, the one or more mixing parameters may include a date and time the mixing was initiated, simultaneous stroke speed, simultaneous revolutions-per-minute, air pressure minimums and maximums, elapsed cycle time, simultaneous stroke count, simultaneous total rotations, temperature minimums and maximums, user identification, locations of application for the mixture, mixture work life, accumulated mixer usage or expected usage for maintenance, and any combinations thereof. The mixing system 100 may then operate based on the one or more mixing parameters selected for the cartridge 102. The processor of the controller 110 may actuate the linear actuator 112 to translate and the spindle 114 to rotate based on the one or more mixing parameters for a period of time and/or for a specified number of strokes.

At step 306, the processor of the controller 110 may receive one or more measured parameters determined during operation of the mixing apparatus 104. The one or more measured parameters may be received from the first switch 106 (referring to FIG. 1) and the magnetic switch 108 (referring to FIG. 1). The processor of the controller 110 may further determine other measured parameters not obtained through the first switch 106 and/or magnetic switch 108. In embodiments, the processor of the controller 110 may add or subtract time and/or strokes to achieve all defined required parameters. Once the designated time for mixing has stopped and/or once the defined required parameters are achieved to stop the mix cycle, the processor of the controller 110 may display the one or more measured parameters through the display 128 (referring to FIG. 1) and/or the one or more mixing parameters as previously described. The displayed parameters may include a total number of rotations of the spindle 114, a total number of strokes of the linear actuator 112, strokes-per-minute, revolutions-per-minute, work life, a total time of mixing, target parameter values, and any combination thereof.

If the one or more measured parameters are not approximately equal to or within a tolerance of the determined mixing parameters from step 304, the light 134 may generate a red colored light that may be indicative of a failure to achieve the required parameters and a risk of achieving homogenous mixing. In embodiments, the tolerances for certain parameters per varying cartridge 102 may be stored in the memory of the controller 110. The method 300 then proceeds to end.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A mixing system, comprising:
   a mixing apparatus configured to:
      receive a cartridge containing a material; and
      mix the material within the cartridge,
      wherein the mixing apparatus comprises a linear actuator and a spindle, wherein the linear actuator is configured to translate the cartridge or a plunger partially disposed within the cartridge in a vertical direction, wherein the spindle is configured to rotate the plunger;
   a first switch coupled to the mixing apparatus and configured to measure a number of strokes per unit of time of operating the linear actuator;
   a magnetic switch coupled to the mixing apparatus and configured to measure a speed of operating the spindle; and
   a controller configured to:
      receive one or more mixing parameters associated with the cartridge;
      actuate the spindle and the linear actuator based on the received one or more mixing parameters; and
      actuate a light to indicate if there was sufficient mixing for the cartridge based on the received one or more mixing parameters.

2. The mixing system of claim 1, wherein the mixing apparatus further comprises a coupler configured to couple a piston rod of the linear actuator to the cartridge.

3. The mixing system of claim 2, wherein the mixing apparatus further comprises a cap configured to secure the cartridge to the coupler.

4. The mixing system of claim 1, wherein a top end of the spindle is configured to receive a base of the plunger, wherein the base is secured to the top end.

5. The mixing system of claim 1, wherein the controller comprises a display housed in a casing configured to display one or more measured parameters, wherein the one or more measured parameters comprises the speed of operating the spindle and the number of strokes per unit of time of operating the linear actuator.

6. The mixing system of claim 5, wherein the light is coupled to the casing and communicatively coupled to the controller.

7. The mixing system of claim 5, wherein the casing is coupled to the mixing apparatus via a bracket.

8. The mixing system of claim 1, wherein the magnetic switch is disposed adjacent to the spindle.

9. The mixing system of claim 1, wherein the linear actuator is a pneumatic piston, wherein the mixing apparatus is coupled to a compressed air source.

10. The mixing system of claim 1, wherein the linear actuator is an electric linear actuator.

* * * * *